March 4, 1952     C. S. KRUCKI     2,587,862

FAUCET HANDLE CONNECTION

Filed Oct. 28, 1946

INVENTOR
CHARLES S. KRUCKI
BY Liverance and
Van Antwerp
ATTORNEYS

Patented Mar. 4, 1952

2,587,862

UNITED STATES PATENT OFFICE 2,587,862

FAUCET HANDLE CONNECTION

Charles S. Krucki, Grand Rapids, Mich., assignor to Crampton Manufacturing Company, Grand Rapids, Mich., a corporation of Michigan Application October 28, 1946, Serial No. 706,247

2 Claims. (Cl. 287—53)

1

This invention relates to handles, primarily for faucets, which are used in plumbing to control the flow of water.

It is a primary object and purpose of the present invention to produce a faucet handle which is of universal application to substantially all of the stems of valves used in connection with the control of flow of water in plumbing. A valve is operated from a closed to an open position by turning it about the longitudinal axis of its stem of generally cylindrical form which is connected with the valve and, through a screw thread connection with a valve housing, the valve may be moved to a position against its seat to close it or away therefrom, upon turning the stem in the proper direction. The valve stems which are used in practice vary somewhat in their diameters, and the manufacturers of plumbing equipment make handles for manually turning the valves which they make, which are usually secured to the stem by a press fit thereon. But whatever the type of connection used, the opening in the handle into which the stem is inserted is of a dimension in accordance with the diameter of the stem. The handles of valves are subject to abuse in many instances causing them to be broken, necessitating replacement. With my invention the handle which I have provided may be applied and secured to any of the differently dimensioned valve stems which are used, so that only one pattern or type of the handle is required, insofar as the valve stem dimension is concerned. Of course the handle of my invention is likewise available for original equipment on the valve stems and may be attached thereto, as well as later for replacement purposes, so that the faucet handle is of universal application and use.

An understanding of the invention may be had from the following description, taken in connection with the accompanying drawing, in which, Fig. 1 is a plan view of the handle of my invention.

Like reference characters refer to like parts in the different figures of the drawing.

Figure 1:
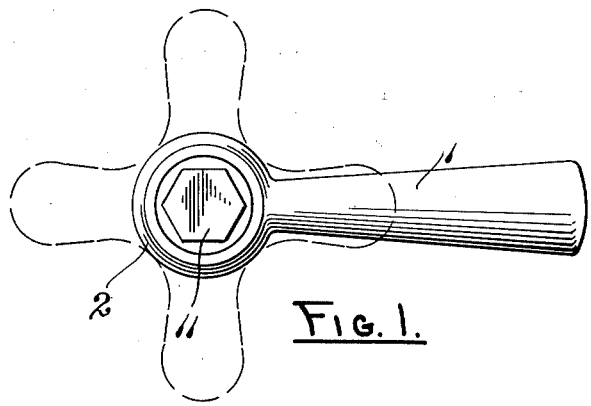
Figure 6:
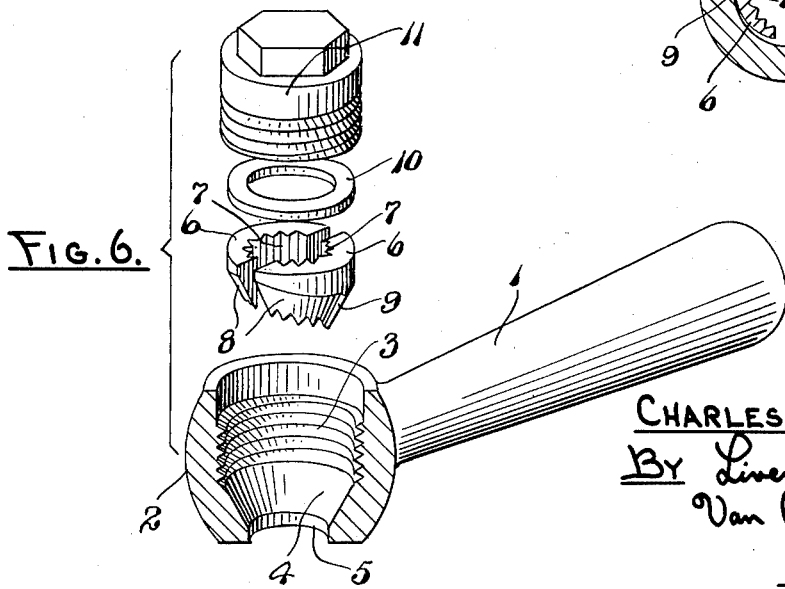
Fig. 6 shows, in perspective and partly in section, the several members or elements which make up the faucet handle structure.

In a faucet handle which is to be attached to the outer end of the valve stem a radial arm or arms to be grasped by the hand for turning are used. The bodies of the faucet handle may include a single arm, such as indicated at 1 in Fig. 1, or a number of them, as for example the four indicated in dash lines in said figure. At one end of the arm 1 when a single arm is used, or at the meeting ends of the radially disposed arms when a plurality are used, a head or socket 2 is integrally cast. It is provided with an opening therethrough from one side to the other. Adjacent its outer side it is of a cylindrical form for a short distance then slightly reduced in diameter and interiorly threaded as at 3. Beyond the threaded section 3 toward the other side the opening is progressively reduced in diameter to provide a seat 4 of frustro-conical form, at the smaller end of which there is a short cylindrical opening 5 to the opposite or inner side of the head as shown in Fig. 6.

Figure 5:
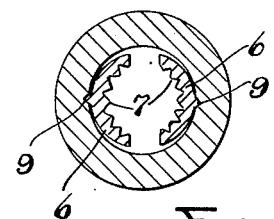
Fig. 5 is a section substantially on the plane of line 5—5 of Fig. 4 looking in the direction indicated.

Within the opening thus made two clamping jaws 6 are located. Each is of an arcuate shape and at its inner side provided with a continuous series of triangular ribs 7 extending the length of the jaws from one end thereof to the other. At one end portion of each jaw it is formed with an outer conical surface 8 complementary to the similar surface 4 of the seat previously described so that when engaged thereagainst and forced in the direction of its length toward the smaller opening 5, the jaws operate as wedges forcing the pointed or sharpened edges of the ribs 7 toward each other. At such surfaces 8, if desired, other triangular ribs 9 extending outwardly therefrom may be provided. One of such ribs is shown in Figs. 5 and 6, but the number may be increased without changing the invention. Also the invention has proved very practical and workable with such rib or ribs 9 not used. Within the opening and against the inner ends of the jaws 6 a washer 10 preferably is located. A screw plug 11 is screwed into and connects with the threaded section coming at its inner end against the washer 11 and forcing it against the inner ends of the jaws 6. In practice the inner end of the plug 11 is recessed as at 11a.

Figure 2:
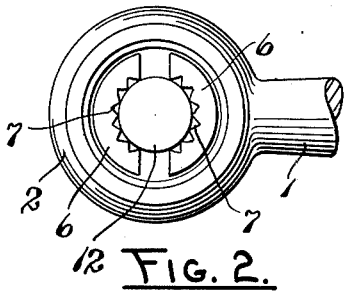
Fig. 2 is a fragmentary enlarged plan view with the tightening screw stud or plug removed.
Figure 4:
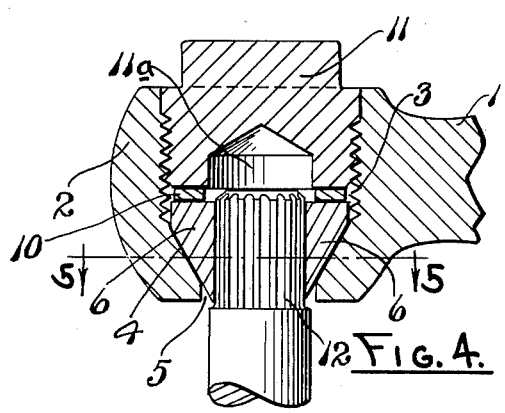
Fig. 4 is a fragmentary transverse section through the handle of my invention, illustrating its manner of connection to the valve stem.
Figure 3:
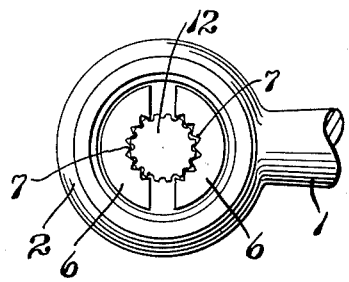
Fig. 3 is a view similar to Fig. 2, differing therefrom in having the valve stem longitudinally fluted instead of plain as in Fig. 2.

With the handle assembled in the manner described, it may be applied to the projecting stem 12 of a valve, the end portion of the stem passing between the jaws 6. The stem may be of plain cylindrical form as in Fig. 2, or as it frequently is, the end portion of the stem may be formed with a consecutive series of longitudinal flutes around it. In either case the stem is readily inserted between the jaws, the screw 11 being retracted to permit a sufficient separation of said jaws, and then by screwing the plug 11 inwardly its pressure is transmitted through the washer 10 against the inner ends of the jaws 6, forcing them, by a wedging action of their conical sides 8 against the seat 4, toward each other with the ribs 7 biting into the stem and making a particularly strong and secure connection therewith. It is to be understood that the jaws are of ferrous metal and are hardened, for example, by case hardening so that they readily penetrate and partly bite into the sides of the metal of the valve stems which, in practice, generally are of brass or other metal softer than a case hardened steel.

It is apparent that with the construction of faucet handle as described its connection to a valve stem is very simple and easy. The ribs 7 and 9, when said ribs 9 are used, engage with the stem 12 and seat 4, and upon an application of a pressure the ribs press or bite into surfaces of the stem and of said seat. This makes an effective locking connection of the handle to the stem. If the ribs 9 are not used the connection is also effective because of the heavy frictional resistance against movement of the jaws with respect to the socket seat 4, against which the jaws are heavily pressed so that any movement of the handle requires a movement of the stem in conformity therewith. The screw 11 which provides the pressure is readily tightened at any time when needed.

The handle is applicable to valve stems of varying diameters within the usual limits of the valve stems which are used in practice, the jaws 6 being movable to engage the outer surfaces of the stems through the construction disclosed. The handle may be used for replacement purposes, upon damage or destruction of a faucet handle which came with the original equipment, or it may be used in originally equipping the valve at the factory.

The invention is defined in the appended claims and is to be considered comprehensive of all forms of structure coming within their scope.

I claim:

1. A faucet handle having a head with a vertical opening therethrough, screw threaded at its upper portion and downwardly and inwardly tapered at its lower portion, said opening being adapted to receive the upper end of a vertically located valve stem axially thereof, a plurality of generally part-circular gripping members located in said tapered portion of the opening, said gripping members having downwardly and inwardly inclined tapered outer sides, the horizontal radii of curvature of which is less than the curvature of the tapered sides of said opening in the head, said gripping members having sharpened teeth projecting from the inner curved sides thereof, said teeth being vertically disposed and being substantially parallel to the axis of the projecting upper end portion of a valve stem adapted to be located between them, and a plug screwed into the upper portion of said opening adapted to force said gripping members downwardly, said gripping members having a limited degree of strain permissible for yielding and conforming to the upper end outer surface of a valve stem adapted to be inserted between the gripping members, thereby adapting the gripping members to valve stems of differing diameters.

2. A faucet handle having a head with a vertical opening therethrough, screw threaded at its upper portion and downwardly and inwardly tapered at its lower portion, said opening being adapted to receive the upper end of a vertically located valve stem axially thereof, a plurality of generally part-circular gripping members located in said tapered portion of the opening, said gripping members having downwardly and inwardly inclined tapered outer sides, the horizontal radii of curvature of which is less than the curvature of the tapered sides of said opening in the head, interengaging means between the tapered sides of the gripping members located substantially midway between their vertical edges' and the tapered sides of the opening through said head for locating and holding said gripping members in non-rotative connection with said head, said gripping members having sharpened teeth projecting from the inner curved sides thereof, said teeth being vertically disposed and being substantially parallel to the axis of the projecting upper end portion of a valve steam adapted to be located between them, and a plug screwed into the upper portion of said opening adapted to force said gripping members downwardly, said gripping members having a limited degree of strain permissible for yielding and conforming to the upper end outer surface of a valve stem adapted to be inserted between the gripping members, thereby adapting the gripping members to valve stems of differing diameters.

CHARLES S. KRUCKI.

REFERENCES CITED

The following references are of record in the file of this patent:

UNITED STATES PATENTS

| Number | Name | Date |
| --- | --- | --- |
| 674,244 | McGeorge | May 14, 1901 |
| 688,785 | Knight | Dec. 10, 1901 |
| 1,343,086 | Neil | June 8, 1920 |
| 1,404,811 | Tubbs | Jan. 31, 1922 |
| 1,491,342 | Eckhardt | Apr. 22, 1924 |
| 1,519,375 | Heintz | Dec. 16, 1924 |
| 1,989,083 | Dahnken et al. | Jan. 29, 1935 |
| 2,105,182 | Church | Jan. 11, 1938 |